(12) United States Patent
Tamura et al.

(10) Patent No.: US 8,901,240 B2
(45) Date of Patent: Dec. 2, 2014

(54) POLYPROPYLENE RESIN COMPOSITION FOR USE IN FORMATION OF MICROPOROUS MEMBRANE

(75) Inventors: Satoshi Tamura, Ichihara (JP); Keita Itakura, Ichihara (JP); Ryoichi Tsunori, Ichihara (JP); Satoshi Hashizume, Ichihara (JP)

(73) Assignees: Mitsui Chemicals Inc., Tokyo (JP); Prime Polymer Co., Ltd., Tokyo (JP)

(*) Notice: Subject to any disclaimer, the term of this patent is extended or adjusted under 35 U.S.C. 154(b) by 606 days.

(21) Appl. No.: 13/143,336

(22) PCT Filed: Jan. 6, 2010

(86) PCT No.: PCT/JP2010/050040
§ 371 (c)(1),
(2), (4) Date: Jul. 5, 2011

(87) PCT Pub. No.: WO2010/079784
PCT Pub. Date: Jul. 15, 2010

(65) Prior Publication Data
US 2011/0294016 A1    Dec. 1, 2011

(30) Foreign Application Priority Data
Jan. 7, 2009  (JP) ................. 2009-001957

(51) Int. Cl.
| | | |
|---|---|---|
| H01M 2/16 | (2006.01) | |
| C08K 3/00 | (2006.01) | |
| C08F 4/76 | (2006.01) | |
| C08F 110/06 | (2006.01) | |
| B01D 63/00 | (2006.01) | |
| H01G 9/00 | (2006.01) | |
| C08L 23/12 | (2006.01) | |
| H01G 9/02 | (2006.01) | |
| C08F 4/659 | (2006.01) | |
| C08F 4/6592 | (2006.01) | |
| C08L 23/04 | (2006.01) | |
| H01M 10/0525 | (2010.01) | |

(52) U.S. Cl.
CPC .............. *H01G 9/155* (2013.01); *C08F 110/06* (2013.01); *C08L 23/12* (2013.01); *H01G 9/02* (2013.01); *H01M 2/1653* (2013.01); *C08F 4/65912* (2013.01); *C08F 4/65916* (2013.01); *C08F 4/65927* (2013.01); *C08L 23/04* (2013.01); *C08L 2314/06* (2013.01); *H01M 10/0525* (2013.01); *Y02E 60/13* (2013.01)
USPC ........... 524/582; 524/584; 429/247; 429/251; 429/249; 525/240; 526/351; 526/130

(58) Field of Classification Search
CPC .............. H01M 2/16; C08K 3/00; C08F 4/76; C08F 110/06; C08L 23/12; B01D 63/00
USPC ............. 264/49; 525/323, 240; 526/351, 130; 524/582, 584; 429/247, 251
See application file for complete search history.

(56) References Cited

U.S. PATENT DOCUMENTS

| | | |
|---|---|---|
| 5,504,172 A | 4/1996 | Imuta et al. |
| 5,739,366 A | 4/1998 | Imuta et al. |
| 5,767,033 A | 6/1998 | Imuta et al. |
| 5,959,046 A | 9/1999 | Imuta et al. |
| 6,566,012 B1 | 5/2003 | Takita et al. |
| 6,770,723 B2 | 8/2004 | Fujita et al. |
| 6,875,718 B2 | 4/2005 | Fujita et al. |
| 6,939,928 B1 | 9/2005 | Kawai et al. |
| 7,183,020 B2 | 2/2007 | Sudou et al. |
| 7,300,903 B2 | 11/2007 | Fujita et al. |
| 7,449,533 B2 | 11/2008 | Kawai et al. |
| 8,491,991 B2 | 7/2013 | Masuda et al. |
| 2005/0228155 A1 | 10/2005 | Kawai et al. |
| 2006/0073389 A1 | 4/2006 | Sudou et al. |
| 2007/0178324 A1 | 8/2007 | Masuda et al. |
| 2007/0238017 A1 | 10/2007 | Call et al. |
| 2008/0042323 A1* | 2/2008 | Inukai et al. ............... 264/328.1 |
| 2009/0219672 A1 | 9/2009 | Masuda et al. |
| 2010/0209758 A1 | 8/2010 | Call et al. |

FOREIGN PATENT DOCUMENTS

| | | |
|---|---|---|
| CN | 101180325 | 5/2008 |
| EP | 1 826 222 A1 | 8/2007 |
| JP | 07-145212 | 6/1995 |
| JP | 07-286075 | 10/1995 |

(Continued)

OTHER PUBLICATIONS

Chinese Office Action issued Sep. 5, 2012 in Corresponding Chinese Application No. 201080004098.8.

(Continued)

*Primary Examiner* — James J Seidleck
*Assistant Examiner* — Deve E Valdez
(74) *Attorney, Agent, or Firm* — Foley & Lardner LLP

(57) ABSTRACT

[Object] To provide a polypropylene resin composition for use in the formation of a microporous membrane having excellent heat resistance and low thermal shrinkage ratio.

[Solution] A polypropylene resin composition for use in the formation of a microporous membrane according to the present invention comprises as an essential component a propylene homopolymer (A) that satisfies the following requirements (1) to (4) and (7):

(1) the intrinsic viscosity [η] is 1 dl/g or more and less than 7 dl/g; (2) the mesopentad fraction ranges from 94.0% to 99.5%; (3) the integral elution volume during heating to 100° C. is 10% or less; (4) the melting point ranges from 153° C. to 167° C.; and (7) in an elution temperature-elution volume curve, the maximum peak has a peak top temperature in the range of 105° C. to 130° C. and a half-width of 7.0° C. or less.

9 Claims, No Drawings

(56) References Cited

FOREIGN PATENT DOCUMENTS

| JP | 11-302436 A | | 11/1999 |
|---|---|---|---|
| JP | 11-315109 A | | 11/1999 |
| JP | 2003-147035 | * | 5/2003 |
| JP | 2004-196871 A | | 7/2004 |
| JP | 2005-225919 A | | 8/2005 |
| JP | 2006-080057 A | | 3/2006 |
| JP | 3852492 B | | 11/2006 |
| JP | 2007-070609 A | | 3/2007 |
| JP | 3995467 B | | 10/2007 |
| JP | 2007-311332 A | | 11/2007 |
| JP | 2008-540815 A | | 11/2008 |
| WO | WO-00/49074 A1 | | 8/2000 |
| WO | WO-01/27124 A1 | | 4/2001 |
| WO | WO-2005/103127 A1 | | 11/2005 |
| WO | WO-2006/125672 | | 11/2006 |
| WO | WO-2007/046226 A1 | | 4/2007 |

OTHER PUBLICATIONS

EP Communication for PCT/JP2010050040 dated May 22, 2012, 4 pages.

Zambelli A., et al. ,"Communications to the Editor", Macromolecules, Sep.-Oct. 1975, vol. 8, No. 5, pp. 687-689.

International Search Report in PCT/JP2010/050040 dated Mar. 23, 2010.

Office Action received in Japanese Patent Application No. 2010-545766 dated Jun. 17, 2014.

* cited by examiner

POLYPROPYLENE RESIN COMPOSITION FOR USE IN FORMATION OF MICROPOROUS MEMBRANE

TECHNICAL FIELD

The present invention relates to a polypropylene resin composition for use in the formation of a microporous membrane having excellent heat resistance and low thermal shrinkage ratio.

BACKGROUND ART

Microporous membranes made of polymeric materials are used in various applications, for example, filter membranes and separation membranes for medical and industrial use, and separators, such as battery separators and condenser separators.

In particular, with the recent growing demand for secondary batteries as power supplies for mobile phones, mobile personal computers, and automobiles, there is also a growing demand for battery separators. However, battery separators made of conventional polymeric materials have insufficient characteristics, particularly unsatisfactory heat resistance and thermal shrinkage ratio.

Use of a blend of polyethylene (PE) and polypropylene (PP) or a higher-molecular-weight polyethylene (PE) to improve the properties of battery separators has resulted in still insufficient characteristics and particularly cannot achieve high heat resistance and low thermal shrinkage ratio.

Patent Literature 1 describes a high-molecular-weight PP defined only by an MFR≤1.2 g/10 min. However, the resulting membrane has unsatisfactory thermal shrinkage ratio.

Patent Literature 2 describes a separator made of polyolefins having different melting points. However, as shown in an example, a separator made of a PP having an MFR of 3 g/10 min and a high-density polyethylene (HDPE) having an MFR of 5.5 g/10 min does not have desired properties as a separator (for example, the upper limit temperature at which pores remain closed and thermal shrinkage ratio).

Patent Literature 3 describes a microporous membrane (separator) made of polyolefins having different viscosity-average molecular weights. However, a high-molecular-weight PE only is used, and there is no description of the properties of the separator.

Patent Literature 4 describes a microporous membrane (separator) made of a polyolefin, particularly a metallocene PE, having a residual Cl amount of 5 ppm or less and a viscosity-average molecular weight of 1,000,000 or more. However, the examples describe only a metallocene PE, and desired properties (for example, 150° C. puncture strength) cannot be achieved. There is no description of thermal shrinkage ratio.

Patent Literature 5 describes a microporous membrane (separator) made of a PE having a viscosity-average molecular weight (Mv) of 300,000<Mv<600,000, a PE having a Mv of 600,000≤Mv≤10,000,000, and a PP (150,000≤Mv≤700,000). However, the microporous membrane (separator) does not have desired properties as a separator (for example, thermal membrane-fracture temperature). There is no description of thermal shrinkage ratio.

Patent Literature 6 describes a microporous membrane (separator) made of a PE and a PP having a weight-average molecular weight (Mw) of 500,000 or more. However, the microporous membrane (separator) cannot achieve desired properties (for example, thermal shrinkage ratio).

Patent Literature 7 describes a microporous membrane (separator) made of two polyolefins each having a weight-average molecular weight (Mw) of 500,000 or more. However, the examples describe only HDPE, and desired heat resistance cannot be achieved. Furthermore, the resulting membrane has unsatisfactory thermal shrinkage ratio.

As described above, application of high-molecular-weight polypropylenes to improve, for example, the heat resistance of microporous membranes has been conducted but had insufficient effects.

CITATION LIST

Patent Literature

Patent Literature 1: JP 2007-311332 A
Patent Literature 2: JP 3852492 B
Patent Literature 3: JP 2007-070609 A
Patent Literature 4: JP 2005-225919 A
Patent Literature 5: JP 3995467 B
Patent Literature 6: JP 2004-196871 A
Patent Literature 7: WO 00/49074 A

SUMMARY OF INVENTION

The present invention has been achieved in view of the situations described above. Accordingly, it is an object of the present invention to provide a polypropylene resin composition for use in the formation of a microporous membrane having excellent heat resistance and low thermal shrinkage ratio.

The present inventors focused on the point that low-crystallinity and low-molecular-weight components in propylene homopolymers melt at relatively low temperatures. The present inventors completed the present invention by finding that a marked decrease in the amount of low-crystallinity and low-molecular-weight component can improve the heat resistance and the dimensional accuracy of propylene homopolymers.

A polypropylene resin composition for use in the formation of a microporous membrane according to the present invention comprises as an essential component a propylene homopolymer (A) that satisfies the following requirements (1) to (4) and (7) and more desirably the following requirement (5):

(1) the intrinsic viscosity [η] measured with a decalin solution is 1 dl/g or more and less than 7 dl/g;

(2) the mesopentad fraction as measured by $^{13}$C-NMR (nuclear magnetic resonance) ranges from 94.0% to 99.5%;

(3) the integral elution volume during heating to 100° C. as measured by cross fractionation chromatography (CFC) using o-dichlorobenzene is 10% or less;

(4) the melting point as measured with a differential scanning calorimeter (DSC) ranges from 153° C. to 167° C.; and (7) in an elution temperature-elution volume curve measured by cross fractionation chromatography (CFC) using o-dichlorobenzene, the maximum peak has a peak top temperature in the range of 105° C. to 130° C. and a half-width of 7.0° C. or less; and (5) the molecular weight distribution index (Mw/Mn), which is the ratio of the weight-average molecular weight Mw to the number-average molecular weight Mn measured by gel permeation chromatography (GPC), is 7 or less.

Preferably, the propylene homopolymer (A) is produced using a metallocene catalyst, and the sum of the ratio of an irregularly bonded unit derived from 2,1-insertion of propylene monomer and the ratio of an irregularly bonded unit derived from 1,3-insertion of propylene monomer to all propylene structural units, determined from a $^{13}$C-NMR spectrum, is 0.1% by mole or less.

Preferably, the polypropylene resin composition for use in the formation of a microporous membrane according to the present invention further comprises at least one material selected from the group consisting of a plasticizer, polyethylene, and an inorganic powder.

Preferably, the polypropylene resin composition for use in the formation of a microporous membrane according to the present invention is used for one selected from the group consisting of a separator, a filter membrane, a separation membrane, and a filter.

The separator is more preferably a battery separator or a condenser separator. The battery separator is particularly preferably a lithium-ion secondary battery separator. The separation membrane is more preferably a medical separation membrane.

Advantageous Effects of Invention

Since the polypropylene resin composition for use in the formation of a microporous membrane according to the present invention comprises the propylene homopolymer (A) that satisfies the particular requirements, the polypropylene resin composition can form a microporous membrane having excellent heat resistance and low thermal shrinkage ratio.

DESCRIPTION OF EMBODIMENTS

The polypropylene resin composition for use in the formation of a microporous membrane according to the present invention will be more specifically described.

[Polypropylene Resin Composition for Use in Formation of Microporous Membrane]

The polypropylene resin composition for use in the formation of a microporous membrane according to the present invention comprises as an essential component the propylene homopolymer (A) that satisfies the following requirements (1) to (4) and (7) and more desirably the following requirement (5):

(1) the intrinsic viscosity [η] measured with a decalin solution is 1 dl/g or more and less than 7 dl/g;

(2) the mesopentad fraction as measured by $^{13}$C-NMR (nuclear magnetic resonance) ranges from 94.0% to 99.5%;

(3) the integral elution volume during heating to 100° C. as measured by cross fractionation chromatography (CFC) using o-dichlorobenzene is 10% or less;

(4) the melting point as measured with a differential scanning calorimeter (DSC) ranges from 153° C. to 167° C.;

(7) in an elution temperature-elution volume curve measured by cross fractionation chromatography (CFC) using o-dichlorobenzene, the maximum peak has a peak top temperature in the range of 105° C. to 130° C. and a half-width of 7.0° C. or less; and (5) the molecular weight distribution index (Mw/Mn), which is the ratio of the weight-average molecular weight Mw to the number-average molecular weight Mn measured by gel permeation chromatography (GPC), is 7 or less.

In the polypropylene resin composition for use in the formation of a microporous membrane according to the present invention, the propylene homopolymer (A) content preferably ranges from 10% to 100% by mass, more preferably 20% to 100% by mass, still more preferably 30% to 100% by mass.

Although the polypropylene resin composition in which the propylene homopolymer (A) content is 100% by mass is practically not a composition, it is also defined as a composition in the present invention.

With the propylene homopolymer (A) content in these ranges, the resulting microporous membrane tends to have excellent heat resistance and low thermal shrinkage ratio.

The requirements (1) to (5) and (7) and a requirement (6) will be described in detail below.

<<Requirement (1)>>

The propylene homopolymer (A) for use in the present invention has an intrinsic viscosity [η] measured with a decalin solution of 1 dl/g or more and less than 7 dl/g, preferably 1.5 dl/g or more and less than 6 dl/g, more preferably 2 dl/g or more and less than 5 dl/g. A Ziegler-type catalyst, a donor, or an after-mentioned metallocene catalyst suitable for the purposes of the present invention can be used as a catalyst to produce a polymer having an intrinsic viscosity [η] within these ranges.

An intrinsic viscosity [η] of less than 1 dl/g results in less entanglement of molecular chains in a microporous membrane and a rupture of the microporous membrane at high temperatures. Thus, the obtained microporous membrane cannot have desired heat resistance. An intrinsic viscosity [η] of 7 dl/g or more makes extrusion molding difficult. Thus, a desired microporous membrane may not be manufactured.

<<Requirement (2)>>

The propylene homopolymer (A) for use in the present invention has a mesopentad fraction in the range of 94.0% to 99.5%, preferably 95.0% to 99.0%, as measured by $^{13}$C-NMR (nuclear magnetic resonance). The mesopentad fraction (mmmm fraction) refers to a percentage of isotactic chains of a pentad unit in a molecular chain, that is, a fraction of a propylene monomer unit existing in the center of a chain in which five propylene monomer units are a meso bonded. A Ziegler-type catalyst, a donor, or an after-mentioned metallocene catalyst suitable for the purposes of the present invention can be used to produce a polymer having a mesopentad fraction within these ranges. Also, the mesopentad fraction can be controlled by changing the polymerization temperature.

The mesopentad fraction of the propylene homopolymer (A) within these ranges results in a microporous membrane having excellent heat resistance and low thermal shrinkage ratio.

<<Requirement (3)>>

The propylene homopolymer (A) for use in the present invention has an integral elution volume during heating to 100° C. of 10% or less, preferably 6% or less, more preferably 4% or less, as measured by cross fractionation chromatography using o-dichlorobenzene (hereinafter referred to as a "CFC method"). The lower limit of the integral elution volume during heating to 100° C. measured by the CFC method is preferably, but not limited to, 0.01% or more. Use of a Ziegler-type catalyst, a donor, or an after-mentioned metallocene catalyst suitable for the purposes of the present invention as a catalyst can yield a polymer having an integral elution volume within these ranges. Polymers having different integral elution volumes can be produced by changing a metallocene compound.

The propylene homopolymer (A) having an integral elution volume in these ranges during heating to 100° C. measured by the CFC method is preferred because it can yield a microporous membrane having excellent heat resistance and low thermal shrinkage ratio.

<<Requirement (4)>>

The propylene homopolymer (A) for use in the present invention has a melting point in the range of 153° C. to 167° C., preferably 160° C. to 166° C., as measured by differential scanning calorimeter (DSC). Use of a Ziegler-type catalyst, a donor, or an after-mentioned metallocene catalyst suitable for the purposes of the present invention as a catalyst can yield a polymer having a melting point within these ranges. Polymers having different melting points can be produced by changing a metallocene compound.

The melting point of the propylene homopolymer (A) within these ranges results in a microporous membrane having excellent heat resistance and low thermal shrinkage ratio.

The propylene homopolymer (A) having a melting point of less than 153° C. as measured by DSC cannot yield a microporous membrane having desired heat resistance. A melting point of more than 167° C. makes stretching difficult. Thus, a desired microporous membrane may not be manufactured.

<<Requirement (7)>>

In an elution temperature-elution volume curve of the propylene homopolymer (A) for use in the present invention as measured by cross fractionation chromatography (CFC) using o-dichlorobenzene, the maximum peak has a peak top temperature in the range of 105° C. to 130° C., preferably 107° C. to 127° C., more preferably 110° C. to 125° C., and a half-width in the range of 7.0° C. or less, preferably 6.0° C. or less, more preferably 4.5° C. or less. The lower limit of the half-width is, but not limited to, 0.5° C.

The peak top temperature within these ranges tends to result in a microporous membrane having low thermal shrinkage ratio. The half-width within these ranges tends to result in a microporous membrane having high air permeability.

In addition to the requirements (1) to (4) and (7), the propylene homopolymer (A) for use in the present invention preferably satisfies the following requirement (5).

<<Requirement (5)>>

The propylene homopolymer (A) for use in the present invention preferably has a molecular weight distribution index (Mw/Mn) of 7 or less, more preferably in the range of 1 to 5, still more preferably in the range of 1.5 to 3.5. The molecular weight distribution index (Mw/Mn) is the ratio of the weight-average molecular weight Mw to the number-average molecular weight Mn as measured by gel permeation chromatography (GPC). Use of a Ziegler-type catalyst, a donor, or an after-mentioned metallocene catalyst suitable for the purposes of the present invention as a catalyst can yield a polymer having an Mw/Mn within these ranges. Polymers having different Mw/Mn can be produced by changing a metallocene compound.

The propylene homopolymer (A) having a Mw/Mn in these ranges is preferred because it can yield a microporous membrane having low thermal shrinkage ratio.

The propylene homopolymer (A) preferably has a weight-average molecular weight Mw in the range of 100,000 to 1,500,000, more preferably 150,000 to 1,400,000, still more preferably 200,000 to 1,300,000.

In addition to the requirements (1) to (5) and (7), the propylene homopolymer (A) for use in the present invention preferably satisfies the following requirement (6).

<<Requirement (6)>>

In the propylene homopolymer (A) for use in the present invention, the sum of the ratio of an irregularly bonded unit derived from 2,1-insertion of propylene monomer and the ratio of an irregularly bonded unit derived from 1,3-insertion of propylene monomer to all propylene structural units, determined from a $^{13}$C-NMR spectrum, is preferably 0.1% by mole or less, more preferably 0.05% by mole or less. A Ziegler-type catalyst, a donor, or an after-mentioned metallocene catalyst suitable for the purposes of the present invention can be used as a catalyst to produce a polymer having the sum of the ratio of irregularly bonded units within these ranges. The sum of the ratio of irregularly bonded units can be controlled by changing the polymerization temperature.

The propylene homopolymer (A) having the sum of the ratio of an irregularly bonded unit derived from 2,1-insertion of propylene monomer and the ratio of an irregularly bonded unit derived from 1,3-insertion of propylene monomer within these ranges tends to yield a microporous membrane having excellent heat resistance and low thermal shrinkage ratio.

Methods for measuring these properties will be described later.

Use of the propylene homopolymer (A) as an essential component can yield a polypropylene resin composition for use in the formation of a microporous membrane having excellent heat resistance and showing low thermal shrinkage ratio.

(Method for Manufacturing Propylene Homopolymer (A))

A method for manufacturing the propylene homopolymer (A) will be described below.

A method for manufacturing the propylene homopolymer (A) for use in the present invention is not particularly limited provided that the propylene homopolymer (A) satisfies the requirements (1) to (4) and (7), and more desirably further satisfies the requirement (5), and particularly preferably further satisfies the requirement (6). In one exemplary manufacturing method, propylene is homopolymerized in the presence of a polymerization catalyst containing a metallocene compound having a cyclopentadienyl skeleton in its molecule.

Examples of a metallocene compound containing a ligand having a cyclopentadienyl skeleton in its molecule include non-bridged metallocene compounds represented by the following general formula [I] and bridged metallocene compounds represented by the following general formula [II] with respect to the chemical structure. Among these, the bridged metallocene compounds represented by the general formula [II] are preferred.

[Chem. 1]

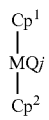

[I]

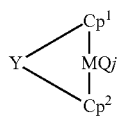

[II]

In the general formulae [I] and [II], M denotes a titanium atom, a zirconium atom, or a hafnium atom, Q is selected from halogen atoms, hydrocarbon groups, anion ligands, and neutral ligands capable of coordination with a lone-pair of electrons, j denotes an integer in the range of 1 to 4, and $Cp^1$ and $Cp^2$, which may be the same or different, denote a cyclopentadienyl group or a substituted cyclopentadienyl group that, together with M, can form a sandwich structure. The substituted cyclopentadienyl group also includes an indenyl group, a fluorenyl group, an azulenyl group, and these groups substituted by one or more hydrocarbon groups. For an indenyl group, a fluorenyl group, and an azulenyl group, part or all of the double bonds of the unsaturated ring(s) that is(are) condensed with the cyclopentadienyl group may be hydrogenated.

In the general formula [II], Y denotes a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^a$—, —P(R$^a$)—, —P(O)(R$^a$)—, —BR$^a$—, or —AlR$^a$—. R$^a$s, which may be the same or different, denote a hydrocarbon group having 1 to 20 carbon atoms, a halogenated hydrocarbon group having 1 to 20 carbon atoms, a hydrogen atom, a halogen atom, or a nitrogen compound residue having one or two hydrocarbon groups bonded to a nitrogen atom, each of the hydrocarbon groups having 1 to 20 carbon atoms.

A polymerization catalyst preferably used in the present invention is a metallocene catalyst that comprises a bridged metallocene compound represented by the following general formula [III] disclosed in an International Publication (WO 01/27124) filed by the same applicants, at least one compound selected from the group consisting of organometallic compounds, organoaluminum oxy compounds, and compounds that can react with a metallocene compound to form an ion pair, and optionally a particulate carrier.

[Chem. 2]

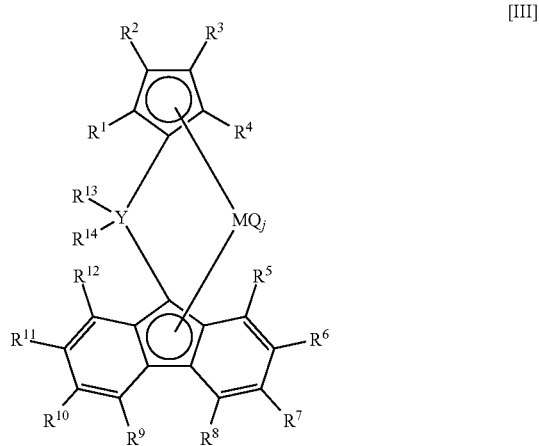

[III]

In the general formula [III], R$^1$, R$^2$, R$^3$, R$^4$, R$^5$, R$^6$, R$^7$, R$^8$, R$^9$, R$^{10}$, R$^{11}$, R$^{12}$, R$^{13}$, and R$^{14}$ are selected from a hydrogen atom, hydrocarbon groups, and silicon-containing groups and may be the same or different from each other.

The hydrocarbon groups include linear hydrocarbon groups, such as a methyl group, an ethyl group, a n-propyl group, an allyl group, a n-butyl group, a n-pentyl group, a n-hexyl group, a n-heptyl group, a n-octyl group, a n-nonyl group, and a n-decanyl group; branched hydrocarbon groups, such as an isopropyl group, a tert-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, and a 1-methyl-1-isopropyl-2-methylpropyl group; cyclic saturated hydrocarbon groups, such as a cyclopentyl group, a cyclohexyl group, a cycloheptyl group, a cyclooctyl group, a norbornyl group, and an adamantyl group; cyclic unsaturated hydrocarbon groups, such as a phenyl group, a tolyl group, a naphthyl group, a biphenyl group, a phenanthryl group, and an anthracenyl group; saturated hydrocarbon groups substituted by a cyclic unsaturated hydrocarbon group, such as a benzyl group, a cumyl group, a 1,1-diphenylethyl group, and a triphenylmethyl group; and hydrocarbon groups containing a heteroatom, such as a methoxy group, an ethoxy group, a phenoxy group, a furyl group, an N-methylamino group, an N,N-dimethylamino group, an N-phenylamino group, a pyrryl group, and a thienyl group.

The silicon-containing groups include a trimethylsilyl group, a triethylsilyl group, a dimethylphenylsilyl group, a diphenylmethylsilyl group, and a triphenylsilyl group.

Adjacent substituents of R$^5$ to R$^{12}$ may be bonded to each other to form a ring. Examples of such a substituted fluorenyl group include a benzofluorenyl group, a dibenzofluorenyl group, an octahydrodibenzofluorenyl group, an octamethyloctahydrodibenzofluorenyl group, and an octamethyltetrahydrodicyclopentafluorenyl group.

In the general formula [III], each of the substituents R$^1$, R$^2$, R$^3$, and R$^4$ on the cyclopentadienyl ring is preferably a hydrogen atom or a hydrocarbon group having 1 to 20 carbon atoms. More preferably, each of R$^2$ and R$^4$ is a hydrocarbon group having 1 to 20 carbon atoms. Particularly preferably, each of R$^1$ and R$^3$ is a hydrogen atom, and each of R$^2$ and R$^4$ is a linear or branched alkyl group having 1 to 5 carbon atoms.

In the general formula [III], each of the substituents R$^5$ to R$^{12}$ on the fluorenyl ring is preferably a hydrogen atom or a hydrocarbon group having 1 to 20 carbon atoms. Examples of the hydrocarbon group having 1 to 20 carbon atoms include the hydrocarbon groups described above. Adjacent substituents of R$^5$ to R$^{12}$ may be bonded to each other to form a ring. In a fluorenyl ring according to a preferred aspect, R$^6$, R$^7$, R$^{10}$, and R$^{11}$ are not hydrogen atoms at the same time.

In the general formula [III], Y bridging between the cyclopentadienyl ring and the fluorenyl ring is preferably a group 14 element, more preferably carbon, silicon, or germanium, still more preferably a carbon atom.

The substitutes R$^{13}$ and R$^{14}$ on Y, which may be the same or different and may be bonded to each other to form a ring, are a hydrocarbon group having 1 to 20 carbon atoms, preferably an alkyl group having 1 to 3 carbon atoms or an aryl group having 6 to 20 carbon atoms. Such a substituent is preferably a methyl group, an ethyl group, a phenyl group, or a tolyl group. R$^{13}$ and/or R$^{14}$ may be bonded to any of the substituents R$^5$ to R$^{12}$ (in general, R$^5$ or R$^{12}$) or any of the substituents R$^1$ to R$^4$ (in general, R$^1$ or R$^4$) to form a ring.

In the general formula [III], M preferably denotes a group 4 transition metal, more preferably a titanium atom, a zirconium atom, or a hafnium atom.

Q is selected from halogens, hydrocarbon groups, anion ligands, and neutral ligands capable of coordination with a lone-pair of electrons. Qs may be the same or different from each other.

j is an integer in the range of 1 to 4. When j is 2 or more, Qs may be the same or different from each other.

Specific examples of halogens include a fluorine atom, a chlorine atom, a bromine atom, and an iodine atom. Specific examples of the hydrocarbon groups include the hydrocarbon groups described above.

Specific examples of the anion ligands include alkoxy groups, such as methoxy, tert-butoxy, and phenoxy, carboxylate groups, such as acetates and benzoates, and sulfonate groups, such as mesylates and tosylates.

Specific examples of the neutral ligands capable of coordination with a lone-pair of electrons include organophosphorus compounds, such as trimethylphosphine, triethylphosphine, triphenylphosphine, and diphenylmethylphosphine, and ethers, such as tetrahydrofuran, diethyl ether, dioxane, and 1,2-dimethoxyethane.

At least one of Qs is preferably a halogen or an alkyl group.

Examples of the preferred bridged metallocene compound include dimethylmethylene(3-tert-butyl-5-methylcyclopentadienyl) (3,6-ditert-butylfluorenyl)zirconium dichloride, 1-phenylethylidene(4-tert-butyl-2-methylcyclopentadienyl) (octamethyloctahydrodibenzofluorenyl)zirconium dichloride, and [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride.

In a metallocene catalyst for use in the production of the propylene homopolymer (A), at least one compound (cocatalyst) selected from the group consisting of organometallic compounds, organoaluminum oxy compounds, and compounds that can react with the metallocene compound to form an ion pair and an optional particulate carrier, used in combination with a metallocene compound represented by the general formula [III], may be any compound disclosed in the patent literature (WO 01/27124 A) by the same applicants or JP 11-315109 A.

The propylene homopolymer (A) can be produced by the polymerization of propylene in a polymerization apparatus including one reactor or one or more reactors connected in series in the presence of the metallocene catalyst, for example, at a polymerization temperature in the range of 0° C. to 100° C. and a polymerization pressure in the range of normal pressure to 5 MPa (gauge pressure).

A method for manufacturing the propylene homopolymer (A) for use in the present invention is not particularly limited provided that the propylene homopolymer (A) satisfies the requirements (1) to (4) and (7), and more desirably further satisfies the requirement (5), and particularly preferably further satisfies the requirement (6). One example is a method for homopolymerizing propylene in the presence of a high stereoregular Ziegler-Matta catalyst. Various known catalysts may be used as the high stereoregular Ziegler-Matta catalysts, such as a catalyst comprising (a) a solid titanium catalyst component comprising magnesium, titanium, a halogen, and an electron donor, (b) an organometallic compound catalyst component, and (c) an organosilicon compound catalyst component having at least one group selected from the group consisting of a cyclopentyl group, a cyclopentenyl group, a cyclopentadienyl group, and derivatives thereof.

The solid titanium catalyst component (a) may be prepared by bringing a magnesium compound (a-1), a titanium compound (a-2), and an electron donor (a-3) into contact with each other. Examples of the magnesium compound (a-1) include magnesium compounds having reducing ability, such as magnesium compounds having a magnesium-carbon bond or a magnesium-hydrogen bond, and magnesium compounds having no reducing ability, such as halogenated magnesium, alkoxymagnesium halides, allyloxymagnesium halides, alkoxymagnesium, allyloxymagnesium, and magnesium carboxylates.

In the preparation of the solid titanium catalyst component (a), for example, a tetravalent titanium compound represented by the following formula (1) is preferably used as the titanium compound (a-2).

$$\text{Ti(OR)}_g X_{4-g} \tag{1}$$

wherein R denotes a hydrocarbon group, X denotes a halogen atom, and g is a number in the range of $0 \leq g \leq 4$.

Specific examples of the tetravalent titanium compound include tetrahalogenated titanium, such as $\text{TiCl}_4$, $\text{TiBr}_4$, and $\text{TiI}_4$; trihalogenated alkoxytitanium, such as $\text{Ti(OCH}_3)\text{Cl}_3$, $\text{Ti(OC}_2\text{H}_5)\text{Cl}_3$, $\text{Ti(O-n-C}_4\text{H}_9)\text{Cl}_3$, $\text{Ti(OC}_2\text{H}_5)\text{Br}_3$, and $\text{Ti(O-iso-C}_4\text{H}_9)\text{Br}_3$; dihalogenated dialkoxy titanium, such as $\text{Ti(OCH}_3)_2\text{Cl}_2$, $\text{Ti(OC}_2\text{H}_5)_2\text{Cl}_2$, $\text{Ti(O-n-C}_4\text{H}_9)_2\text{Cl}_2$, and $\text{Ti(OC}_2\text{H}_5)_2\text{Br}_2$; monohalogenated trialkoxy titanium, such as $\text{Ti(OCH}_3)_3\text{Cl}$, $\text{Ti(OC}_2\text{H}_5)_3\text{Cl}$, $\text{Ti(O-n-C}_4\text{H}_9)_3\text{Cl}$, and $\text{Ti(OC}_2\text{H}_5)_3\text{Br}$; and tetraalkoxytitanium, such as $\text{Ti(OCH}_3)_4$, $\text{Ti(OC}_2\text{H}_5)_4$, $\text{Ti(O-n-C}_4\text{H}_9)_4$, $\text{Ti(O-iso-C}_4\text{H}_9)_4$, and $\text{Ti(O-2-ethylhexyl)}_4$.

Examples of the electron donor (a-3) used in the preparation of the solid titanium catalyst component (a) include alcohols, phenols, ketones, aldehydes, esters of organic acids and inorganic acids, organic acid halides, ethers, acid amides, acid anhydrides, ammonia, amines, nitriles, isocyanates, nitrogen-containing cyclic compounds, and oxygen-containing cyclic compounds.

When the magnesium compound (a-1), the titanium compound (a-2), and the electron donor (a-3) are brought into contact with each other, another reactive agent, such as silicon, phosphorus, or aluminum, may coexist. Furthermore, a carrier may be used to prepare a solid titanium catalyst component (a) supported by the carrier.

The solid titanium catalyst component (a) may be used by any method, including known methods. Some exemplary methods are briefly described below.

(1) A method in which a hydrocarbon solution of a magnesium compound (a-1) comprising an electron donor (liquefying agent) (a-3) is allowed to react with an organometallic compound and, after a solid has been precipitated or while the solid is precipitated, is allowed to react with a titanium compound (a-2).

(2) A method in which a complex between a magnesium compound (a-1) and an electron donor (a-3) is allowed to react with an organometallic compound and then with a titanium compound (a-2).

(3) A method in which a contact product between an inorganic carrier and an organomagnesium compound (a-1) is allowed to react with a titanium compound (a-2) and an electron donor (a-3). The contact product may be allowed to react with a halogen-containing compound and/or an organometallic compound in advance.

(4) A method in which a carrier loaded with a magnesium compound (a-1) is prepared from a mixture of a magnesium compound (a-1) solution containing a liquefying agent and optionally a hydrocarbon solvent, an electron donor (a-3), and the carrier and is then brought into contact with a titanium compound (a-2).

(5) A method in which a solution containing a magnesium compound (a-1), a titanium compound (a-2), an electron donor (a-3), and optionally a hydrocarbon solvent is brought into contact with a carrier.

(6) A method in which a liquid organomagnesium compound (a-1) is brought into contact with a halogen-containing titanium compound (a-2). An electron donor (a-3) is used at least once.

(7) A method in which a liquid organomagnesium compound (a-1) is brought into contact with a halogen-containing compound and then with a titanium compound (a-2). Through this process, an electron donor (a-3) is used at least once.

(8) A method in which a magnesium compound (a-1) containing an alkoxy group is brought into contact with a halogen-containing titanium compound (a-2). An electron donor (a-3) is used at least once.

(9) A method in which a complex between a magnesium compound (a-1) containing an alkoxy group and an electron donor (a-3) is brought into contact with a titanium compound (a-2).

(10) A method in which a complex between a magnesium compound (a-1) containing an alkoxy group and an electron donor (a-3) is brought into contact with an organometallic compound and is then allowed to react with a titanium compound (a-2).

(11) A method in which a magnesium compound (a-1), an electron donor (a-3), and a titanium compound (a-2) are allowed to contact and react in any order. Before this reaction, each of the component may be subjected to preliminary treatment with a reaction aid, such as an electron donor (a-3), an organometallic compound, or a halogen-containing silicon compound.

(12) A method in which a liquid magnesium compound having no reducing ability (a-1) is allowed to react with a liquid titanium compound (a-2) in the presence of an electron donor (a-3) to precipitate a solid magnesium-titanium complex.

(13) A method in which the reaction product of (12) is further allowed to react with a titanium compound (a-2).

(14) A method in which the reaction product of (11) or (12) is further allowed to react with an electron donor (a-3) and a titanium compound (a-2).

(15) A method in which a solid prepared by pulverizing a magnesium compound (a-1), a titanium compound (a-2), and an electron donor (a-3) is treated with a halogen, a halide, or an aromatic hydrocarbon. This method may include a process of pulverizing the magnesium compound (a-1) alone, a complex compound between the magnesium compound (a-1) and the electron donor (a-3), or the magnesium compound (a-1) and the titanium compound (a-2). The pulverization may be followed by preliminary treatment with a reaction aid and then by halogen treatment. The reaction aid may be an organometallic compound or a halogen-containing silicon compound.

(16) A method in which a magnesium compound (a-1) is pulverized and is then brought into contact with a titanium compound (a-2). When the magnesium compound (a-1) is pulverized and/or brought into contact with a titanium compound (a-2), an electron donor (a-3) is used, if necessary, together with a reaction aid.

(17) A method in which the compound produced in any one of (11) to (16) is treated with a halogen, a halide, or an aromatic hydrocarbon.

(18) A method in which a reaction product from a metal oxide, an organomagnesium (a-1), and a halogen-containing compound is brought into contact with an electron donor (a-3) and preferably a titanium compound (a-2).

(19) A method in which a magnesium compound (a-1), such as a magnesium salt of an organic acid, an alkoxymagnesium, or an aryloxymagnesium, is brought into contact with a titanium compound (a-2), an electron donor (a-3), and if necessary a halogen-containing hydrocarbon.

(20) A method in which a hydrocarbon solution comprising a magnesium compound (a-1) and an alkoxytitanium is brought into contact with an electron donor (a-3) and if necessary a titanium compound (a-2). Preferably, a halogen-containing compound, such as a halogen-containing silicon compound, coexist.

(21) A method in which a liquid magnesium compound having no reducing ability (a-1) is allowed to react with an organometallic compound to precipitate a solid magnesium-metal (aluminum) complex and is then allowed to react with an electron donor (a-3) and a titanium compound (a-2).

The organometallic compound catalyst component (b) is preferably a component comprising aluminum and/or a metal selected from the groups I to III of the periodic table and specifically includes an organoaluminum compound (b-1), a complex alkyl compound (b-2) between a group I metal and aluminum, and an organometallic compound (b-3) of a group II or III metal as described below.

The organoaluminum compound (b-1) represented by formula $R^{21}_m Al(OR^{22})_n H_p X_q$, wherein $R^{21}$ and $R^{22}$, which may be the same or different, denote a hydrocarbon group generally having 1 to 15 (preferably 1 to 4) carbon atoms, X denotes a halogen atom, m denotes a number in the range of $0 < m \leq 3$, n denotes a number in the range of $0 \leq n < 3$, p denotes a number in the range of $0 \leq p < 3$, q denotes a number in the range of $0 \leq q < 3$, and $m+n+p+q=3$.

The complex alkylated compound (b-2) between a group I metal and aluminum represented by formula $M^1 AlR^{21}_4$, wherein $M^1$ denotes Li, Na, or K, and $R^{21}$ denotes a hydrocarbon group generally having 1 to 15 (preferably 1 to 4) carbon atoms.

The organometallic compound (dialkyl compound) (b-3) of a group II or III metal represented by formula $R^{21}R^{22}M^2$, wherein $R^{21}$ and $R^{22}$, which may be the same or different, denote a hydrocarbon group generally having 1 to 15 (preferably 1 to 4) carbon atoms, and $M^2$ denotes Mg, Zn, or Cd.

Examples of the organoaluminum compound (b-1) include a compound represented by $R^{21}_m Al(OR^{22})_{3-m}$, (wherein $R^{21}$ and $R^{22}$, which may be the same or different, denote a hydrocarbon group generally having 1 to 15 (preferably 1 to 4) carbon atoms, and m is preferably a number in the range of $1.5 \leq m \leq 3$), a compound represented by $R^{21}_m AlX_{3-m}$ (wherein $R^{21}$ denotes a hydrocarbon group generally having 1 to 15 (preferably 1 to 4) carbon atoms, X denotes a halogen atom, and m is preferably a number in the range of $0 < m < 3$), a compound represented by $R^{21}_m AlH_{3-m}$, (wherein $R^{21}$ denotes a hydrocarbon group generally having 1 to 15 (preferably 1 to 4) carbon atoms, and m is preferably a number in the range of $2 \leq m < 3$), and a compound represented by $R^{21}_m Al(OR^{22})_n X_q$ (wherein $R^{21}$ and $R^{22}$, which may be the same or different, denote a hydrocarbon group generally having 1 to 15 (preferably 1 to 4) carbon atoms, X denotes a halogen atom, m is a number in the range of $0 < m \leq 3$, n is a number in the range of $0 \leq n < 3$, q is a number in the range of $0 \leq q < 3$, and $m+n+q=3$).

Specific examples of the organosilicon compound catalyst component (c) include organosilicon compounds represented by the following formula (2):

$$SiR^{23}R^{24}_a(OR^{25})_{3-a} \qquad (2)$$

wherein a denotes 0, 1, or 2, $R^{23}$ denotes a group selected from the group consisting of a cyclopentyl group, a cyclopentenyl group, a cyclopentadienyl group, and derivatives thereof, and $R^{24}$ and $R^{25}$ independently denote a hydrocarbon group.

Specific examples of $R^{23}$ in the formula (2) include a cyclopentyl group and derivatives thereof, such as a cyclopentyl group, a 2-methylcyclopentyl group, a 3-methylcyclopentyl group, a 2-ethylcyclopentyl group, a 3-propylcyclopentyl group, a 3-isopropylcyclopentyl group, a 3-butylcyclopentyl group, a 3-tert-butylcyclopentyl group, a 2,2-dimethylcyclopentyl group, a 2,3-dimethylcyclopentyl group, a 2,5-dimethylcyclopentyl group, a 2,2,5-trimethylcyclopentyl group, a 2,3,4,5-tetramethylcyclopentyl group, a 2,2,5,5-tetramethylcyclopentyl group, a 1-cyclopentylpropyl group, and a 1-methyl-1-cyclopentylethyl group; cyclopentenyl group and derivatives thereof, such as a cyclopentenyl group, a 2-cyclopentenyl group, a 3-cyclopentenyl group, a 2-methyl-1-cyclopentenyl group, a 2-methyl-3-cyclopentenyl group, a 3-methyl-3-cyclopentenyl group, a 2-ethyl-3-cyclopentenyl group, a 2,2-dimethyl-3-cyclopentenyl group, a 2,5-dimethyl-3-cyclopentenyl group, a 2,3,4,5-tetramethyl-3-cyclopentenyl group, and a 2,2,5,5-tetramethyl-3-cyclopentenyl group; a cyclopentadienyl group and derivatives thereof, such as a 1,3-cyclopentadienyl group, a 2,4-cyclopentadienyl group, a 1,4-cyclopentadienyl group, a 2-methyl-1,3-cyclopentadienyl group, a 2-methyl-2,4-cyclopentadienyl group, a 3-methyl-2,4-cyclopentadienyl group, a 2-ethyl-2,4-cyclopentadienyl group, a 2,2-dimethyl-2,4-cyclopentadienyl group, a 2,3-dimethyl-2,4-cyclopentadienyl group, a 2,5-dimethyl-2,4-cyclopentadienyl group, and a 2,3,4,5-tetramethyl-2,4-cyclopentadienyl group; and derivatives of a cyclopentyl group, a cyclopentenyl group, and a cyclopentadienyl group, such as an indenyl group, a 2-methylindenyl group, a 2-ethylindenyl group, a 2-indenyl group, a 1-methyl-2-indenyl group, a 1,3-dimethyl-2-indenyl group, an indanyl group, a 2-methylindanyl group, a 2-indanyl group, a 1,3-dimethyl-2-indanyl group, a 4,5,6,7-tetrahydroindenyl group, a 4,5,6,7-tetrahydro-2-indenyl group, a 4,5,6,7-tetrahydro-1-methyl-2-indenyl group, a 4,5,6,7-tetrahydro-1,3-dimethyl-2-indenyl group, and a fluorenyl group.

Specific examples of the hydrocarbon group of $R^{24}$ and $R^{25}$ in the formula (2) include hydrocarbon groups, such as alkyl groups, cycloalkyl groups, aryl groups, and aralkyl groups. Two or more $R^{24}$ present, $R^{24}$s may be the same or different from each other, two or more $R^{25}$ present, $R^{25}$s may be the same or different from each other, and $R^{24}$s may be the same as or different from $R^{25}$s. $R^{23}$ and $R^{24}$ in the formula (2) may be bridged via an alkylene group or the like.

Among organosilicon compounds represented by the formula (2), an organosilicon compound in which $R^{23}$ is a cyclopentyl group, $R^{24}$ is an alkyl group or a cyclopentyl group, and $R^{25}$ is an alkyl group, particularly a methyl group or an ethyl group, is preferred.

Specific examples of the organosilicon compounds represented by the formula (2) include trialkoxysilanes, such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane, and fluorenyltrimethoxysilane; dialkoxysilanes, such as dicyclopentyldimethoxysilane, bis(2-methylcyclopentyl)dimethoxysilane, bis(3-tert-butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyldimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane, and indenylfluorenyldimethoxysilane; monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane, and diindenylcyclopentylmethoxysilane; and others, such as ethylenebiscyclopentyldimethoxysilane.

Prepolymerization may be performed in the polymerization of propylene using a catalyst comprising the solid titanium catalyst component (a), the organometallic compound catalyst component (b), and the organosilicon compound catalyst component (c). In the prepolymerization, an olefin is polymerized in the presence of the solid titanium catalyst component (a), the organometallic compound catalyst component (b), and if necessary the organosilicon compound catalyst component (c).

The olefin in the prepolymerization may be an $\alpha$-olefin having 2 to 8 carbon atoms. Specific examples of the olefin include linear olefins, such as ethylene, propylene, 1-butene, and 1-octene; and olefins having a branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, and 3-ethyl-1-hexene. These olefins may be copolymerized.

It is desirable to perform the prepolymerization so as to produce approximately 0.1 to 1000 g, preferably approximately 0.3 to 500 g, of a polymer per gram of the solid titanium catalyst component (a). An excessive amount of polymer produced in the prepolymerization may result in a low yield of the polymer in the main polymerization. The catalyst concentration may be much higher in the prepolymerization than in the main polymerization.

In the main polymerization, it is desirable to use the solid titanium catalyst component (a) (or prepolymerized catalyst) in an amount of approximately 0.0001 to 50 mmol, preferably approximately 0.001 to 10 mmol, in terms of a titanium atom per liter of the polymerization volume. It is desirable to use the organometallic compound catalyst component (b) in an amount of approximately 1 to 2000 mol, preferably approximately 2 to 500 mol in terms of a metal atom per mol of titanium atom in the polymerization system. It is desirable to use the organosilicon compound catalyst component (c) in an amount of approximately 0.001 to 50 mol, preferably approximately 0.01 to 20 mol per mol of metal atom in the organometallic compound catalyst component (b).

The high stereoregular Ziegler-Natta catalyst is preferably a catalyst containing (a) a solid titanium catalyst component containing magnesium, titanium, chlorine, and diisobutyl phthalate (DIBP), (b) triethylaluminum, and (c) dicyclopentyldimethoxysilane.

(Other Components)

Preferably, the polypropylene resin composition for use in the formation of a microporous membrane according to the present invention also comprises at least one material selected from the group consisting of a plasticizer, polyethylene, and an inorganic powder.

Polyethylene

In order to impart a function, such as shutdown characteristics, polyethylene may be added into the polypropylene resin composition for use in the formation of a microporous membrane according to the present invention.

The polyethylene refers to a polyethylene having a density in the range of 925 to 970 kg/m$^3$, preferably 930 to 965 kg/m$^3$.

The polyethylene preferably has an intrinsic viscosity [η] measured with a decalin solution in the range of 1 to 20 dl/g, more preferably 2 to 20 dl/g.

The amount of polyethylene in the propylene-based resin composition comprising the propylene homopolymer (A) and the polyethylene depends on the characteristics to be imparted and generally ranges from 1% to 99% by mass, preferably 10% to 95% by mass.

Plasticizer

In order to control the shape and number of pores, a plasticizer may be added to the polypropylene resin composition for use in the formation of a microporous membrane according to the present invention. The amount of plasticizer preferably ranges from 0 to 200 parts by mass, more preferably 0 to 150 parts by mass, still more preferably 0 to 100 parts by mass, per 100 parts by mass of the propylene homopolymer (A).

Examples of the plasticizer include solvents that are liquid at room temperature, such as aliphatic, alicyclic, and aromatic hydrocarbons, for example, nonane, decane, decalin, paraxylene, and liquid paraffin, and mineral oil fractions having corresponding boiling points, and solvents that are solid at room temperature, such as stearyl alcohol and paraffin wax. Among these, solvents that are liquid at room temperature are preferred, and liquid paraffin is particularly preferred.

Inorganic Powder

In order to control the shape and number of pores and heat resistance, an inorganic powder may be added to the polypropylene resin composition for use in the formation of a microporous membrane according to the present invention.

Examples of the inorganic powder include talc, clay, calcium carbonate, mica, silicates, carbonates, glass fiber, carbon fiber, and oxides and nitrides of metals, such as silicon, aluminum and titanium. Among these, oxides and nitrides of metals are preferred, and a silica powder is particularly preferred. It is desirable that the inorganic powder have an average particle size in the range of 0.001 to 10 μm, preferably 0.01 to 5 μm. The inorganic powder may be used alone or in combination. The amount of inorganic powder per 100 parts by weight of a polypropylene resin composition for use in the formation of a microporous membrane preferably ranges from 1 to 80 parts by weight, more preferably 10 to 60 parts by weight.

(Method for Preparing Polypropylene Resin Composition for Use in Formation of Microporous Membrane)

A method for preparing the polypropylene resin composition for use in the formation of a microporous membrane according to the present invention may be carried out by any of various known methods. In one exemplary method, various components described above are kneaded in a common kneader, such as a Henschel mixer, a ribbon blender, or a Banbury mixer. Melt-kneading and pelletization involve melt-kneading with a common single-screw or twin-screw extruder, a Brabender, or a roll at 170° C. to 280° C., preferably 190° C. to 250° C., and pelletization preferably in a nitrogen atmosphere. Alternatively, the polypropylene resin composition may be directly formed into a sheet or film for a microporous membrane by a conventionally known technique without pelletization.

(Applications)

Preferably, the polypropylene resin composition for use in the formation of a microporous membrane according to the present invention is used for at least one selected from the group consisting of a separator, a filter membrane, a separation membrane, and a filter. A Separator, a filter membrane, a separation membrane, and a filter formed of the polypropylene resin composition for use in the formation of a microporous membrane have excellent heat resistance and low thermal shrinkage ratio.

The separator is more preferably a battery separator or a condenser separator. The battery separator is particularly preferably a lithium-ion secondary battery separator. The separation membrane is more preferably a medical separation membrane.

(Microporous Membrane)

Microporous membranes having excellent heat resistance and low thermal shrinkage ratio can be suitably manufactured from the polypropylene resin composition for use in the formation of a microporous membrane.

A method for manufacturing the microporous membrane includes the steps of (1) melt-kneading the polypropylene resin composition or each component of the polypropylene resin composition, (2) carrying out extruding from die lips and cooling to form a sheet or film, (3) stretching the sheet or film in at least one direction, if necessary (4) extracting or removing a plasticizer, and (5) drying the resulting membrane. Any of these steps may be performed by a conventionally known technique. In order for sufficient melt-kneading in the step (1), a twin-screw extruder is desirable. In the step (2), although rectangular die lips for sheet extrusion are desirable, a cylindrical blown-film die lip may also be used. In the step (3), it is desirable to stretch the sheet or film by a tenter method or a roll method at a stretching temperature in the range of 60° C. to 160° C. at an area magnification factor in the range of 2 to 100. The stretching may be performed before and after the step (4) or (5) in twice. In the step (4), it is desirable to use an extracting solvent that is a poor solvent for a polyolefin resin and an inorganic powder and a good solvent for a plasticizer and has a boiling point lower than the melting point of the polyolefin microporous membrane. Examples of the extracting solvent include hydrocarbons, such as n-hexane and cyclohexane, halogenated hydrocarbons, such as methylene chloride and carbon tetrachloride, alcohols, such as ethanol and isopropanol, ethers, such as diethyl ether, and ketones, such as acetone. The step (5) employs a heat-drying method or an air-drying method. These methods are desirably performed at a temperature at which the characteristics of the microporous membrane are not deteriorated. If necessary, other steps may be performed, such as the addition of an additive agent, such as a conventionally known nucleating agent (α-crystalline nucleating agent, such as a phosphate metal salt or a sorbitol type compound, or β-crystalline nucleating agent, such as an amide type compound), heat treatment of the membrane, cross-linking treatment, surface treatment, and hydrophilic treatment. In order to impart a shutdown function, blending or multilayering with a resin (containing the polyethylene) having a lower melting point than the polypropylene resin composition may be performed. In order to impart further heat resistance, blending or multilayering with a resin having a higher melting point than the polypropylene resin composition may be performed.

EXAMPLES

While the present invention will now be more specifically described in the following examples, the present invention is not limited to these examples. The physical properties in the examples and comparative examples were measured by the following methods.

(m1) Intrinsic Viscosity [η]

The intrinsic viscosity [η] of a propylene homopolymer was measured with a decalin solvent at 135° C. as described below.

Approximately 20 mg of a sample was dissolved in 15 ml of decalin, and the specific viscosity $\eta_{sp}$ was measured in an oil bath at 135° C. After the decalin solution was diluted with additional 5 ml of a decalin solvent, the specific viscosity $\eta_{sp}$ was measured in the same manner. The dilution was repeated twice more. $\eta_{sp}/C$ extrapolated to a concentration (C) of zero was determined as the intrinsic viscosity.

$$[\eta] = \lim(\eta_{sp}/C)(C \rightarrow 0)$$

(m2) Mesopentad Fraction

The mesopentad fraction [mmmm] of a propylene homopolymer is a value defined by the assignments described in A. zambelli et al., Macromolecules, 8, 687 (1975) and was determined by the equation: mesopentad fraction=(peak area at 21.7 ppm)/(peak area in the range of 19 to 23 ppm), as measured by $^{13}$C-NMR under the following conditions.

| Type | JNM-Lambda 400 (manufactured by JEOL Ltd.) |
|---|---|
| Resolution | 400 MHz |
| Measurement temperature | 125° C. |
| Solvent | 1,2,4-trichlorobenzene/deuterated benzene = 7/4 |
| Pulse width | 7.8 μsec |
| Pulse interval | 5 sec |
| Number of scans | 2000 |
| Chemical Shift Reference | TMS = 0 ppm |
| Mode | single pulse broadband decoupling |

(m3) Integral Elution Volume during Heating to 100° C. Measured by CFC

The integral elution volume of a propylene homopolymer during heating to 100° C. was measured with CFC T-150A manufactured by Mitsubishi Petrochemical Co., Ltd. in the following manner.

Separation column: Shodex AT-806MS (three columns), Eluent: o-dichlorobenzene, Sample concentration: 0.15 to 0.3 wt/vol %, Injection volume: 0.5 ml, Flow rate: 1.0 ml/min. A sample was heated at 135° C. for 2 hours and was cooled to 0° C. at 1° C./min. The sample was held at 0° C. for 60 minutes and was coated. The void volume of temperature-rising elution column was 0.86 ml, and the pipe volume was 0.06 ml.

A detector was a Foxboro infrared spectrometer MIRAN 1A CVF (CaF$_2$ cell). Infrared light of 3.42 μm (2924 cm$^{-1}$) was detected in an absorbance mode at a response time of 10 seconds. The elution temperature range between 0° C. and 135° C. was divided into 25 to 35 fractions. In particular, the elution temperature range in the vicinity of the elution peak emerged was divided into 2° C.-interval fraction. All the temperatures were expressed by an integer. For example, the elution fraction at 120° C. refers to components eluted in the range of 118° C. to 120° C. The molecular weights of components not coated even at 0° C. and fractions eluted at each temperature were measured. The PP equivalent molecular weight was determined using a universal calibration curve. SEC temperature: 135° C., Injection volume of internal standard: 0.5 ml, Injection position: 3.0 ml, data sampling time: 0.50 seconds.

In the case of abnormal pressure because of an excessive amount of components eluted in a narrow temperature range, the sample concentration may be reduced to less than 0.15 wt/vol %. Data processing was performed by an analysis program "CFC data processing (version 1.50)" included with the apparatus. Although the cross fractionation (CFC) is said to reproduce the results with high analytical precision under the strictly same measurement conditions, two or more measurements were averaged in the examples of the present invention.

(m4) Melting Point (Tm)

The melting point (Tm) of a propylene homopolymer was measured with a differential scanning calorimeter (DSC, manufactured by PerkinElmer, Inc.) in the following manner. An endothermic peak in the third step was defined as the melting point (Tm).

<Preparation of Sample Sheet>

A sample placed between aluminum foil was pressed with a metal mold (thickness: 0.2 mm) under the following conditions.

Forming temperature: 240° C. (heating temperature 240° C., preheating time: 7 minutes)
Pressing pressure: 300 kg/cm$^2$
Pressing time: 1 minute After press forming, the metal mold was cooled to approximately room temperature in ice water to form a sample sheet.

<Measurement>

Approximately 0.4 g of the resulting sample sheet was enclosed in a container described below and was subjected to DSC measurement under measurement conditions described below.

(Container)
Aluminum Pan (DSC PANS 10 μl BO-14-3015)
Aluminum Cover (DSC COVER BO14-3003)
(Measurement Conditions)
First step: Heating to 240° C. at 30° C./min and holding for 10 minutes.
Second step: Cooling to 30° C. at 10° C./min.
Third step: Heating to 240° C. at 10° C./min.

(m5) Measurement of Mw/Mn [Weight-Average Molecular Weight (Mw), Number-Average Molecular Weight (Mn)]

The weight-average molecular weight (Mw) and the number-average molecular weight (Mn) of a propylene homopolymer were measured with GPC-150C Plus manufactured by Waters Corp. in the following manner.

The separation columns were TSKgel GMH6-HT and TSKgel GMH6-HTL, each of which has an inner diameter of 7.5 mm and a length of 600 mm. The column temperature was 140° C. The mobile phase was o-dichlorobenzene (Wako Pure Chemical Industries, Ltd.) containing 0.025% by mass BHT (Wako Pure Chemical Industries, Ltd.) as an antioxidant and was fed at 1.0 ml/min. The sample concentration was 0.1% by mass. The sample injection volume was 500 microliters. A differential refractometer was used as a detector. For standard polystyrene, a product by Tosoh Corp. was used for a molecular weight Mw<1000 and Mw>4×10$^6$, and a product by Pressure Chemical Co. was used for a molecular weight $1000 \leq Mw \leq 4 \times 10^6$.

(m6) Measurement of Ratio of 2,1-Insertion and Ratio of 1,3-Insertion

The ratios of 2,1-insertion and 1,3-insertion of a propylene monomer based on all the propylene constitutional units were determined by $^{13}$C-NMR in accordance with a method described in Japanese Unexamined Patent Application Publication No. 7-145212.

(m7) Residual Cl Amount (ppm)

0.8 g of a propylene homopolymer was burned at a temperature in the range of 400° C. to 900° C. in an argon/oxygen stream in a combustion apparatus manufactured by Mitsubishi Kasei Corp. The combustion gas was then collected into ultrapure water. After concentration, the sample liquid was introduced into Nippon Dionex DIONEX-DX300 ion chromatograph. The amount of residual Cl in the propylene homopolymer was measured with an anion column AS4A-SC (manufactured by Dionex Corp.).

(m8) Gurley Permeability

The Gurley permeability of a microporous membrane was measured in accordance with JIS P8117.

(m9) Thermal Shrinkage Ratio

The thermal shrinkage ratio of a microporous membrane was measured in the following manner.

A 250×250 mm sample film was left in a circulating hot-air oven at 100° C. for 6 hours and was then cooled to room temperature. The thermal shrinkage ratio was calculated from the sample dimension L0 before the oven treatment and the sample dimension L1 after the oven treatment by the following equation.

Thermal shrinkage ratio(%)=$(L0-L1)/L0 \times 100$ (m10) Meltdown Temperature

The meltdown temperature of a microporous membrane was measured in the following manner.

A 2 g weight was attached to a microporous membrane. The microporous membrane was heated at 5° C./min. A temperature at which the microporous membrane was melted and broken was considered as the meltdown temperature.

(m11) Peak Top Temperature and Half-Width of Peak

The peak top temperature of the maximum peak and the half-width of the peak were determined from an elution temperature-elution volume curve obtained by the CFC measurement in (m3).

Synthesis Example 1

(Synthesis of Propylene Homopolymer (PP1))
(1) Manufacture of Solid Catalyst Carrier 300 g of $SiO_2$ (SUNSPHERE H121 manufactured by AGC Si-Tech. Co., Ltd.) was sampled in a 1-L side-arm flask and was slurried by the addition of 800 mL of toluene. After the slurry was transferred to a 5-L four-neck flask, 260 mL of toluene was added to the flask. 2830 mL of a solution (10% by weight solution) of methylaluminoxane (hereinafter referred to as MAO) in toluene was added to the flask. The slurry was stirred at room temperature for 30 minutes. The slurry was heated to 110° C. in 1 hour and was allowed to react for 4 hours. After the completion of the reaction, the slurry was cooled to room temperature. After cooling, the supernatant toluene was replaced with fresh toluene until the replacement rate reached 95%.

(2) Manufacture of Solid Catalyst (Supporting of Metal Catalyst Component on Carrier)

1.0 g of isopropyl(3-t-butyl-5-methylcyclopentadienyl)(3,6-di-t-butylfluorenyl)zirconium dichloride was weighed into a 5-L four-neck flask in a glove box. After the flask was taken out, 0.5 L of toluene and 2.0 L of the MAO/$SiO_2$/toluene slurry (100 g of a solid component) prepared in (1) were added to the flask in a nitrogen atmosphere and were stirred for 30 minutes for supporting. The resulting isopropyl(3-t-butyl-5-methylcyclopentadienyl)(3,6-di-t-butylfluorenyl) zirconium dichloride/MAO/$SiO_2$/toluene slurry was subjected to 99% substitution with n-heptane. The final amount of slurry was 4.5 liters. This procedure was performed at room temperature.

(3) Manufacture of Prepolymerized Catalyst

A 200-L autoclave equipped with an agitator was charged with 101 g of the solid catalyst component prepared in (2), 111 mL of triethylaluminum, and 80 L of heptane. While the internal temperature was kept in the range of 15° C. to 20° C., 303 g of ethylene was added and was allowed to react for 180 minutes while stirring. After the completion of the polymerization, a solid component was precipitated. The removal of supernatant liquid and rinse with heptane were performed twice. The resulting prepolymerized catalyst was resuspended in purified heptane. The concentration of the solid catalyst component was adjusted to 1 g/L with heptane. The prepolymerized catalyst contained 3 g of polyethylene per gram of the solid catalyst component.

(4) Main Polymerization

A 58-L circulating tubular polymerization reactor equipped with a jacket was continuously supplied with 30 kg/h of propylene, 5 NL/h of hydrogen, 4.0 g/h (in terms of the solid catalyst component) of the catalyst slurry prepared in (3), and 1.0 ml/h of triethylaluminum. The polymerization was performed while the reactor was fully filled with the reactants without gas phase. The temperature of the tubular polymerization reactor was 30° C., and the pressure was 3.1 MPa/G.

The resulting slurry was transferred to a 1000-L vessel polymerization reactor equipped with a stirrer and further polymerization was conducted. To the polymerization reactor, propylene was fed at 50 kg/h, and hydrogen was fed such that the hydrogen concentration in the gas phase was 0.08% by mole. The polymerization was performed at a polymerization temperature of 70° C. and a pressure of 3.0 MPa/G.

The resulting slurry was transferred to a 500-L vessel polymerization reactor equipped with a stirrer and further polymerization was conducted. To the polymerization reactor, propylene was fed at 15 kg/h, and hydrogen was fed such that the hydrogen concentration in the gas phase was 0.08% by mole. The polymerization was performed at a polymerization temperature of 69° C. and a pressure of 2.9 MPa/G.

The resulting slurry was transferred to a 500-L vessel polymerization reactor equipped with a stirrer and further polymerization was conducted. To the polymerization reactor, propylens was fed at 12 kg/h, and hydrogen was fed such that the hydrogen concentration in the gas phase was 0.08% by mole. The polymerization was performed at a polymerization temperature of 68° C. and a pressure of 2.9 MPa/G.

The resulting slurry was transferred to a 500-L vessel polymerization reactor equipped with a stirrer and further polymerization was conducted. To the polymerization reactor, propylene was fed at 13 kg/h, and hydrogen was fed such that the hydrogen concentration in the gas phase was 0.08% by mole. The polymerization was performed at a polymerization temperature of 67° C. and a pressure of 2.9 MPa/G.

The resulting slurry was subjected to vaporization and was subjected to gas-solid separation to produce a propylene polymer. The propylene polymer was produced at 40 kg/h. The propylene polymer was vacuum-dried at 80° C.

Table 1 shows the characteristics of the resulting propylene homopolymer (PP1).

Synthesis Example 2

(Synthesis of Propylene Homopolymer (PP2))
(1) Manufacture of Solid Catalyst Carrier 27 L of toluene and 7.5 kg of $SiO_2$ (CARiACT P10 manufactured by Fuji Silysia Chemical Ltd.) were slurried in a 200-L reaction vessel equipped with a stirrer. While the vessel temperature was kept in the range of 0° C. to 5° C., 73 L of a MAO-toluene solution (10% by weight solution) was introduced into the vessel over 30 minutes and was stirred for 30 minutes. The slurry was heated to 95° C. in 1 hour and was allowed to react for 4 hours. After the completion of the reaction, the slurry was cooled to 60° C. After cooling, the supernatant toluene was replaced with fresh toluene until the replacement rate reached 95%.

(2) Manufacture of Solid Catalyst (Supporting of Metal Catalyst Component on Carrier)

A 14-L reaction vessel equipped with a stirrer was charged with 7.9 L of the MAO/$SiO_2$/toluene slurry (1030 g of a solid component) prepared in (1) and was kept at a temperature in the range of 30° C. to 35° C. while stirring. 10.3 g of [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride was weighed into a 1-L flask in a glove box. After the flask was taken out, the dichloride was diluted with 0.5 liters of toluene and was added to the reaction vessel. Toluene was added to the reaction vessel such that the fluid volume in the reaction vessel reached 10 L. Supporting was performed for 60 minutes while stirring. The resulting [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride/MAO/SiO$_2$/toluene slurry was cooled to room temperature and was subjected to 92% substitution with n-heptane. The final volume of the slurry was 10 L.

(3) Manufacture of Prepolymerized Catalyst

A 200-L autoclave equipped with a stirrer was charged with 18 L of n-heptane and then 1040 g of the solid catalyst component prepared in (2) was transferred into the autoclave. While the internal temperature was kept in the range of 15° C. to 20° C., 554 g of triisobutylaluminum was added to the autoclave, and the fluid volume was adjusted to 62 L with n-heptane. While the internal temperature was kept in the range of 30° C. to 35° C. while stirring, 3120 g of ethylene was added to the autoclave at 630 g/h and was allowed to react for 300 minutes while stirring. After the completion of the polymerization, a solid component was precipitated. The removal of supernatant liquid and rinse with heptane were performed twice. The resulting prepolymerized catalyst was resuspended in purified heptane. The concentration of the solid catalyst component was adjusted to 8 g/L with heptane. The prepolymerized catalyst contained 3 g of polyethylene per gram of the solid catalyst component.

(4) Main Polymerization

A 58-L circulating tubular polymerization reactor equipped with a jacket was continuously supplied with 53 kg/h of propylene, 9.5 NL/h of hydrogen, 8.0 g/h (in terms of the solid catalyst component) of the catalyst slurry prepared in (3), and 2.9 ml/h of triethylaluminum. The polymerization was performed while the reactor was fully filled with the reactants without gas phase. The temperature of the tubular polymerization reactor was 70° C., and the pressure was 3.1 MPa/G.

The resulting slurry was transferred to a 100-L vessel polymerization reactor equipped with a stirrer and further polymerization was conducted. To the polymerization reactor, propylene was fed at 15 kg/h, and hydrogen was fed such that the hydrogen concentration in the gas phase was 0.11% by mole. The polymerization was performed at a polymerization temperature of 70° C. and a pressure of 3.0 MPa/G.

The resulting slurry was subjected to vaporization and was subjected to gas-solid separation to produce a propylene polymer. The propylene polymer was produced at 12 kg/h. The propylene polymer was vacuum-dried at 80° C.

Table 1 shows the characteristics of the resulting propylene homopolymer (PP2).

Synthesis Example 3

(Synthesis of Propylene Homopolymer (PP3))
(1) Preparation of Solid Titanium Catalyst Component 952 g of anhydrous magnesium chloride, 4420 mL of decane, and 3906 g of 2-ethylhexyl alcohol were heated at 130° C. for 2 hours to prepare a homogeneous solution. 213 g of phthalic anhydride was added to the solution and was stirred at 130° C. for another 1 hour to dissolve phthalic anhydride. After the resulting homogeneous solution was cooled to 23° C., 750 mL of the homogeneous solution was added dropwise to 2000 mL of titanium tetrachloride kept at −20° C. over 1 hour. After the dropwise addition, the resulting mixed liquid was heated to 110° C. over 4 hours. When the temperature reached 110° C., 52.2 g of diisobutyl phthalate (DIBP) was added to the mixed liquid and was heated at 110° C. for 2 hours. A solid was then collected by hot filtration. The solid was resuspended in 2750 mL of titanium tetrachloride and was heated at 110° C. for 2 hours. After heating, a solid was collected again by hot filtration and was washed with 110° C. decane and hexane until a titanium compound was not detected in the washings. The resulting solid titanium catalyst component was stored as hexane slurry. Part of the hexane slurry was dried, and the catalyst composition was analyzed. The solid titanium catalyst component contained 2% by weight titanium, 57% by weight chlorine, 21% by weight magnesium, and 20% by weight DIBP.

(2) Manufacture of Prepolymerized Catalyst

A 200-L autoclave equipped with a stirrer was charged with 120 g of a transition metal catalyst component (solid titanium catalyst component), 20.5 mL of triethylaluminum, and 120 L of heptane. While the internal temperature was kept at 5° C., 720 g of propylene was added and was allowed to react for 60 minutes while stirring. After the completion of the polymerization, a solid component was precipitated. The removal of supernatant liquid and rinse with heptane were performed twice. The resulting prepolymerized catalyst was resuspended in purified heptane such that the concentration of the transition metal catalyst component (solid titanium catalyst component) was 1 g/L. The prepolymerized catalyst contained 6 g of a propylene homopolymer per gram of the transition metal catalyst component (solid titanium catalyst component).

(3) Main Polymerization

A 100-L vessel polymerization reactor equipped with a stirrer was continuously supplied with 110 kg/h of propylene, 1.4 g/h (in terms of the transition metal catalyst component (solid titanium catalyst component)) of the catalyst slurry prepared in (2), 5.8 mL/h of triethylaluminum, and 2.6 mL/h of dicyclopentyldimethoxysilane. Hydrogen was supplied such that the hydrogen concentration in the gas phase was 0.9% by mole. The polymerization was performed at a polymerization temperature of 73° C. and a pressure of 3.2 MPa/G. The resulting slurry was transferred to a 1000-L vessel polymerization reactor equipped with a stirrer and further polymerization was conducted. To the polymerization reactor, propylene was fed at 30 kg/h, and hydrogen was fed such that the hydrogen concentration in the gas phase was 1.3% by mole. The polymerization was performed at a polymerization temperature of 71° C. and a pressure of 3.0 MPa/G. The resulting slurry was transferred to a 500-L vessel polymerization reactor equipped with a stirrer and further polymerization was conducted. To the polymerization reactor, propylene was fed at 46 kg/h, and hydrogen was fed such that the hydrogen concentration in the gas phase was 1.3% by mole. The polymerization was performed at a polymerization temperature of 69° C. and a pressure of 2.9 MPa/G. The resulting slurry was deactivated and was transferred to a washing tank, in which a propylene homopolymer powder was washed with liquid propylene. The obtained slurry was subjected to vaporization and was subjected to gas-solid separation to produce a propylene polymer. The propylene homopolymer was introduced into a conical dryer and was vacuum-dried at 80° C. 35.9 g of pure water and 0.63 liters of propylene oxide were then added for 100 kg of the product. Dechlorination at 90° C. for 2 hours and then vacuum drying at 80° C. yielded a propylene homopolymer powder.

Table 1 shows the characteristics of the resulting propylene homopolymer (PP3).

Synthesis Example 4

(Synthesis of Propylene Homopolymer (PP4))
(1) Prepolymerization

A 0.5-liter three-neck flask equipped with a stirrer was purged with nitrogen gas and was then charged with 400 ml of dehydrated heptane, 18 mmol of triethylaluminum, 3.7 mmol of dicyclopentyldimethoxysilane, and 4 g of a solid titanium catalyst component (TK200 catalyst manufactured by Mitsui Chemicals, Inc.). Propylene was introduced into the flask at an internal temperature of 20° C. while stirring. After 1 hour, the agitation was stopped. 2.0 g of propylene per gram of the solid catalyst had been polymerized to produce a prepolymerized catalyst component.

(2) Main Polymerization

A 6-liter stainless autoclave equipped with a stirrer was completely dried, was purged with nitrogen, and was charged with 6 liters of dehydrated heptane, 6 mmol of triethylaluminum, and 0.6 mmol of dicyclopentyldimethoxysilane. After nitrogen in the system was replaced with propylene, propylene was introduced while stirring. After the system was stabilized at an internal temperature of 80° C. and a propylene pressure of 0.8 MPa-G, 100 ml of heptane slurry containing 0.46 mmol (in terms of a Ti atom) of the prepolymerized catalyst component was added. Propylene was continuously supplied and polymerized at 80° C. for 4 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 3080 g of a propylene polymer.

Table 1 shows the characteristics of the resulting propylene homopolymer (PP4).

Synthesis Example 5

(Synthesis of Propylene Homopolymer (PP5))
(1) Manufacture of Solid Catalyst Carrier 27 L of toluene and 7.5 kg of $SiO_2$ (CARiACT P10 manufactured by Fuji Silysia Chemical Ltd.) were slurried in a 200-L reaction vessel equipped with a stirrer. While the vessel temperature was kept in the range of 0° C. to 5° C., 73 L of a MAO-toluene solution (10% by weight solution) was introduced into the vessel over 30 minutes and was stirred for 30 minutes. The slurry was heated to 95° C. in 1 hour and was allowed to react for 4 hours. After the completion of the reaction, the slurry was cooled to 60° C. After cooling, the supernatant toluene was replaced with fresh toluene until the replacement rate reached 95%.

(2) Manufacture of Solid Catalyst (Supporting of Metal Catalyst Component on Carrier)

A 14-L reaction vessel equipped with a stirrer was charged with 7.2 L of the MAO/$SiO_2$/toluene slurry (1000 g of a solid component) prepared in (1) and was kept at a temperature in the range of 30° C. to 35° C. while stirring. 15 g of diphenylmethylene(3-t-butyl-5-methylcyclopentadienyl)(2,7-di-t-butylfluorenyl)zirconium dichloride was weighed into a 1-L flask in a glove box. After the flask was taken out, the dichloride was diluted with 0.5 liters of toluene and was added to the reaction vessel. Toluene was added to the reaction vessel such that the fluid volume in the reaction vessel reached 10 L. Supporting was performed for 60 minutes while stirring. The resulting diphenylmethylene(3-t-butyl-5-methylcyclopentadienyl)(2,7-di-t-butylfluorenyl)zirconium dichloride/MAO/$SiO_2$/toluene slurry was cooled to room temperature and was subjected to 92% substitution with n-heptane. The final amount of the slurry was 10 L.

(3) Manufacture of Prepolymerized Catalyst

A 200-L autoclave equipped with a stirrer was charged with 20 L of n-heptane and then 1015 g of the solid catalyst component prepared in (2) was transferred into the autoclave. While the internal temperature was kept in the range of 15° C. to 20° C., 594 g of triisobutylaluminum was added to the autoclave, and the fluid volume was adjusted to 64 L with n-heptane. While the internal temperature was kept in the range of 30° C. to 35° C. while stirring, 3045 g of ethylene was added to the autoclave at 610 g/h and was allowed to react for 300 minutes while stirring. After the completion of the polymerization, a solid component was precipitated. The removal of supernatant liquid and rinse with heptane were performed twice. The resulting prepolymerized catalyst was resuspended in purified heptane. The concentration of the solid catalyst component was adjusted to 8 g/L with heptane. The prepolymerized catalyst contained 3 g of polyethylene per gram of the solid catalyst component.

(4) Main Polymerization

A 58-L circulating tubular polymerization reactor equipped with a jacket was continuously supplied with 53 kg/h of propylene, 5.3 NL/h of hydrogen, 9.2 g/h (in terms of the solid catalyst component) of the catalyst slurry prepared in (3), and 3.1 ml/h of triethylaluminum. The polymerization was performed while the reactor was fully filled with the reactants without gas phase. The temperature of the tubular polymerization reactor was 70° C., and the pressure was 3.1 MPa/G. The resulting slurry was transferred to a 100-L vessel polymerization reactor equipped with a stirrer and further polymerization was conducted. To the polymerization reactor, propylene was fed at 15 kg/h, and hydrogen was fed such that the hydrogen concentration in the gas phase was 0.11% by mole. The polymerization was performed at a polymerization temperature of 70° C. and a pressure of 3.0 MPa/G.

The resulting slurry was subjected to vaporization and was subjected to gas-solid separation to produce a propylene polymer. The propylene polymer was produced at 12 kg/h. The propylene polymer was vacuum-dried at 80° C.

Table 1 shows the characteristics of the resulting propylene homopolymer (PP5).

Synthesis Example 6

(Synthesis of Propylene Homopolymer (PP6))
(1) Prepolymerization

A 0.5-liter three-neck flask equipped with a stirrer was purged with nitrogen gas and was then charged with 400 ml of dehydrated heptane, 18 g of diethylaluminum chloride, and 2 g of a commercially available Solvay-type titanium trichloride catalyst (manufactured by Tosoh Finechem Corp.). While the internal temperature was kept at 20° C., propylene was introduced into the flask while stirring. After 80 minutes, the agitation was stopped. 0.8 g of propylene per gram of the solid catalyst had been polymerized to produce a prepolymerized catalyst component.

(2) Propylene Polymerization

A 6-liter stainless autoclave equipped with a stirrer was completely dried, was purged with nitrogen, and was charged with 6 liters of dehydrated heptane. Nitrogen in the system was replaced with propylene. Propylene was then introduced while stirring. After the system was stabilized at a temperature of 70° C. and a pressure of 0.8 MPa-G, 200 ml of heptane slurry containing 1.0 g (in terms of a solid catalyst) of the prepolymerized catalyst component was added. Propylene was continuously supplied and polymerized at 70° C. for 5 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation.

Subsequent vacuum drying for 4 hours yielded 2740 g of a propylene polymer.

Table 1 shows the characteristics of the resulting propylene homopolymer (PP6).

TABLE 1

| Item | | Unit | PP1 | PP2 | PP3 | PP4 | PP5 | PP6 |
|---|---|---|---|---|---|---|---|---|
| [η] | | dl/g | 2.5 | 1.8 | 2.1 | 6.6 | 2.0 | 10.8 |
| mmmm | | % | 97.0 | 95.3 | 98.0 | 95.2 | 91.0 | 86.4 |
| CFC | Integral elution volume up to 100° C. | % | 0.1 | 7.0 | 3.4 | 5.1 | 75 | 86.4 |
| | Peak top temperature | ° C. | 116 | 110 | 121 | 114 | 101 | 97 |
| | Peak half-width | ° C. | 2.8 | 4.1 | 5.8 | 6.5 | 4.7 | 7.2 |
| Residual Cl amount | | ppm | <1 | <1 | 2 | 6 | <1 | 32 |
| Melting point | | ° C. | 158 | 155 | 164 | 164 | 147 | 160 |
| Mw | | — | 360,000 | 230,000 | 370,000 | 1,270,000 | 260,000 | 2,200,000 |
| Mw/Mn | | — | 2.0 | 2.6 | 6.5 | 6.0 | 2.7 | 9.0 |
| Ratio of an irregularly bonded unit (2,1-insertion + 1,3-insertion) | | mol % | 0 | 0 | 0 | 0 | 0.2 | 0 |

Examples 1 to 3 and Comparative Example 1

A blend of the polypropylene resin composition in the amount shown in the following Table 2 and 1000 ppm of an antioxidant Irganox 1010 was melt-kneaded in a GMZ50-32 (L/D=32, 50 mmϕ) single-screw extruder manufactured by GM Engineering Co., Ltd. at a resin temperature of 230° C. to pelletize the polypropylene. The pellets were melt-extruded at 200° C. by a T-die having a width of 300 mm and a lip gap of 4 mm. The extrudate was taken up at 8 m/min by a chill roll at 80° C. The draft ratio was 86, and the resulting unstretched polypropylene film had a thickness of 40 μm. 20% cold stretching between nip rolls at 35° C., hot stretching between rolls at 126° C. to a total stretching ratio of 180%, and 36% relaxation between rolls at 126° C. yielded a microporous membrane. Table 2 shows the physical properties of the microporous membrane.

Example 4 and Comparative Example 2

In the amount shown in Table 2, the polypropylene resin composition, 1000 ppm of an antioxidant Irganox 1010, and solid paraffin were fed to Labo Plastomill (manufactured by Toyo Seiki Seisaku-Sho, Ltd.) at 250° C. and the number of revolutions of 20 rpm and were kneaded at 60 rpm for 3 minutes. Hot pressing at 220° C. at 100 kg/cm² and cooling to 30° C. yielded a pressed sheet having a thickness of 100 μm. The pressed sheet was stretched by 4fold×5fold at 150° C. to prepare a stretched film. The stretched film was immersed in n-heptane at room temperature for 2 hours and was then vacuum-dried at room temperature for 4 hours to remove the solid paraffin, forming a microporous membrane. Table 2 shows the properties of the microporous membrane.

TABLE 2

| | | | Example | | | | Comparative example | |
|---|---|---|---|---|---|---|---|---|
| Item | | Unit | 1 | 2 | 3 | 4 | 1 | 2 |
| Formulation | PP1 | wt % | 100 | — | — | — | — | — |
| | PP2 | | — | 100 | — | — | — | — |
| | PP3 | | — | — | 100 | — | — | — |
| | PP4 | | — | — | — | 50 | — | — |
| | PP5 | | — | — | — | — | 100 | — |
| | PP6 | | — | — | — | — | — | 50 |
| | Solid paraffin | | — | — | — | 50 | — | 50 |
| Properties of microporous membranes | Gurley permeability | sec/100 cc | 500 | 400 | 500 | 600 | 1100 | 700 |
| | Thermal shrinkage ratio | % | 2.2 | 2.8 | 3.2 | 2.5 | 6.1 | 9.5 |
| | Meltdown temperature | ° C. | 172 | 170 | 170 | 174 | 162 | 168 |

Note)
Solid paraffin: LUVAX-1266 (melting point 69° C.) manufactured by Nippon Seiro Co., Ltd.

The invention claimed is:

1. A polypropylene resin composition for use in the formation of a microporous membrane comprising as an essential component a propylene homopolymer (A) that satisfies the following requirements (1) to (4) and (7):
   (1) the intrinsic viscosity [η] measured with a decalin solution is 1 dl/g or more and less than 7 dl/g;
   (2) the mesopentad fraction as measured by $^{13}$C-NMR (nuclear magnetic resonance) ranges from 94.0% to 99.5%;
   (3) the integral elution volume during heating to 100° C. as measured by cross fractionation chromatography (CFC) using o-dichlorobenzene is 10% or less;
   (4) the melting point as measured with a differential scanning calorimeter (DSC) ranges from 153° C. to 167° C.; and
   (7) in an elution temperature-elution volume curve measured by cross fractionation chromatography (CFC) using o-dichlorobenzene, the maximum peak has a peak top temperature in the range of 105° C. to 130° C. and a half-width of 7.0° C. or less.

2. The polypropylene resin composition for use in the formation of a microporous membrane according to claim 1, wherein the propylene homopolymer (A) also satisfies the following requirement (5):
   (5) the molecular weight distribution index (Mw/Mn), which is the ratio of the weight-average molecular weight Mw to the number-average molecular weight Mn measured by gel permeation chromatography (GPC), is 7 or less.

3. The polypropylene resin composition for use in the formation of a microporous membrane according to claim 1, wherein the propylene homopolymer (A) is produced using a metallocene catalyst.

4. The polypropylene resin composition for use in the formation of a microporous membrane according to claim 1, wherein the sum of the ratio of an irregularly bonded unit derived from 2,1-insertion of propylene monomer and the ratio of an irregularly bonded unit derived from 1,3-insertion of propylene monomer to all the propylene constitutional units of the propylene homopolymer (A), determined from a $^{13}$C-NMR spectrum, is 0.1% by mole or less.

5. The polypropylene resin composition for use in the formation of a microporous membrane according to claim 1, further comprising at least one material selected from the group consisting of a plasticizer, polyethylene, and an inorganic powder.

6. The polypropylene resin composition for use in the formation of a microporous membrane according to claim 1, wherein the polypropylene resin composition is used for one selected from the group consisting of a separator, a filter membrane, a separation membrane, and a filter.

7. The polypropylene resin composition for use in the formation of a microporous membrane according to claim 6, wherein the separator is a battery separator or a condenser separator.

8. The polypropylene resin composition for use in the formation of a microporous membrane according to claim 7, wherein the battery separator is a lithium-ion secondary battery separator.

9. The polypropylene resin composition for use in the formation of a microporous membrane according to claim 6, wherein the separation membrane is a medical separation membrane.

* * * * *